Nov. 26, 1935.  R. H. CUNNINGHAM  2,022,587
PROCESS OF DECORATING MOLDED RESIN WARE AND PRODUCT THEREOF
Filed Nov. 8, 1934  2 Sheets-Sheet 1
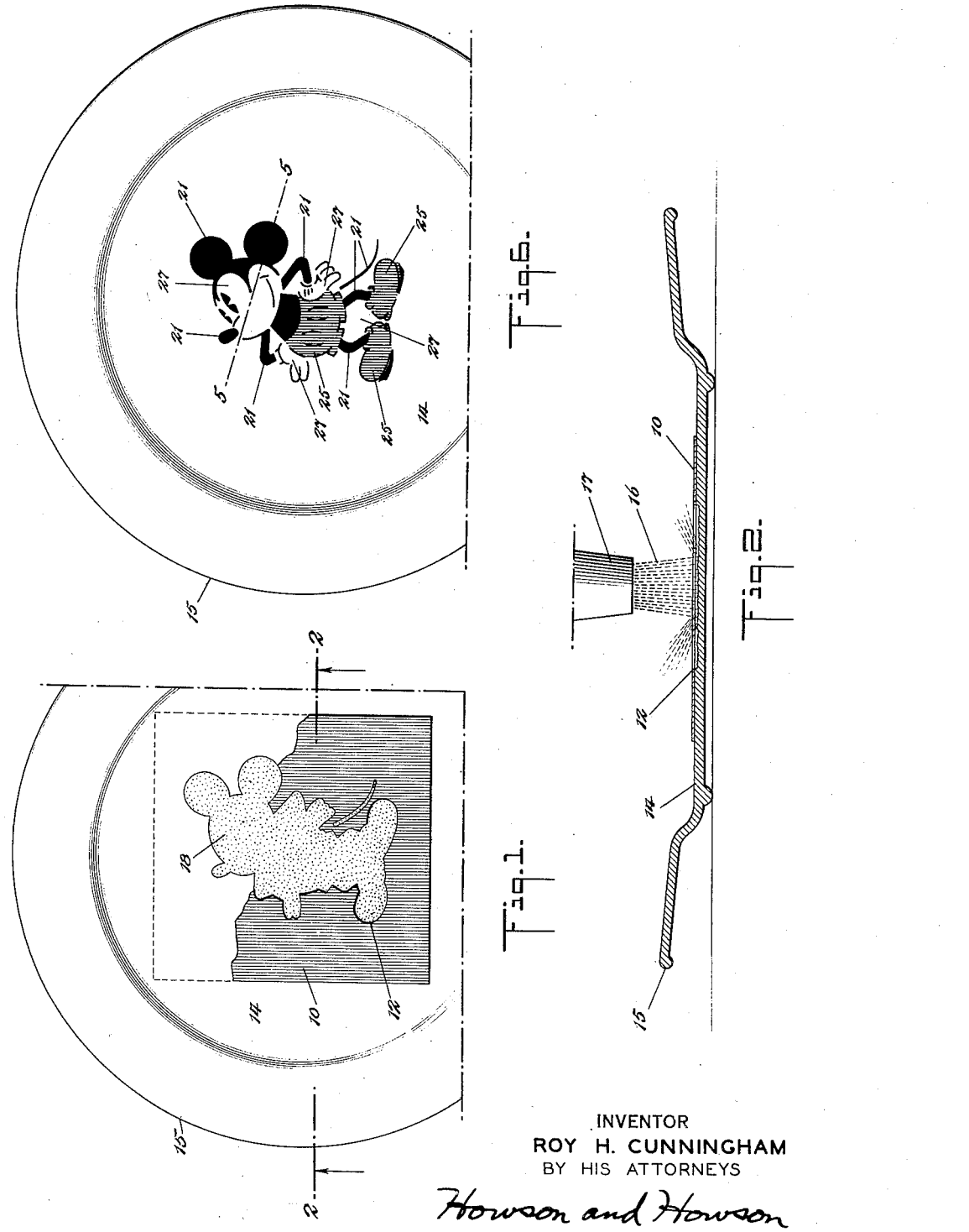
INVENTOR
ROY H. CUNNINGHAM
BY HIS ATTORNEYS
Howson and Howson Nov. 26, 1935.   R. H. CUNNINGHAM   2,022,587
PROCESS OF DECORATING MOLDED RESIN WARE AND PRODUCT THEREOF
Filed Nov. 8, 1934   2 Sheets-Sheet 2
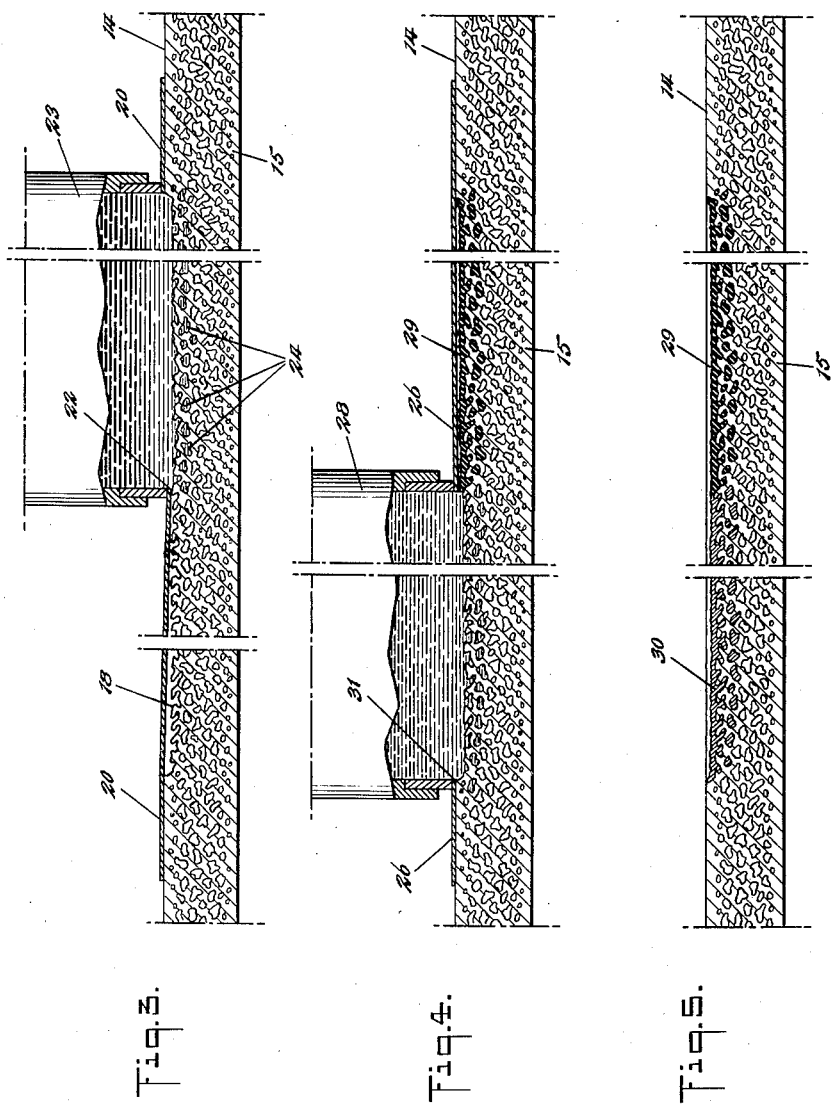
INVENTOR
ROY H. CUNNINGHAM
BY HIS ATTORNEYS
Howson and Howson Patented Nov. 26, 1935

2,022,587

UNITED STATES PATENT OFFICE 2,022,587

PROCESS OF DECORATING MOLDED RESIN WARE AND PRODUCT THEREOF

Roy H. Cunningham, Fairfield, Conn., assignor to The Bryant Electric Company, Bridgeport, Conn., a corporation of Connecticut Application November 8, 1934, Serial No. 752,180

11 Claims. (Cl. 41—30)

This invention relates to method of decorating molded resin ware and product thereof, and has for its principal object to apply a permanent design of contrasting color to molded resin ware which is difficult of ornamentation by ordinary methods.

The invention is carried out by removing, for example by abrading or sand-blasting, a portion of the smooth non-absorptive surface of the molded resin ware article to be decorated and thereby exposing a more porous sub-surface, and filling the area of the depression formed thereby to a depth no greater than that of the material removed, with coating material such for example as lacquer, the lacquer being colored in the colored areas of the design and transparent in the uncolored areas thereof, and applied under pressure sufficient to cause the lacquer to penetrate the pores of the sub-surface and effect a secure bond therewith.

Molded resin ware presents a smooth, non-absorptive outer shell or surface and is therefore peculiarly difficult of ornamentation as it resists adhesion of coloring materials, and even if special paints or lacquers could be applied thereto, these would rub or chip off in ordinary use of the ware. Lacquers scrape off easily, inks wash off, and decalcomanias scrape off and also frequently peel or strip off, when subjected to long immersion in hot water.

I have discovered that such ware, particularly of urea resin, has a more porous interior texture, which may be exposed by removing the outer surface and the sub-surface may be permanently colored or coated by liquid materials applied, by an air gun or the like, under pressure sufficient to penetrate the pores of the sub-surface. Preferably the outer surface is removed by abrasion, such as sand-blasting through a mask having an opening of the outline of the desired design. The coloring material such as ink, dye, or waterproof lacquer is preferably applied through a stencil of the outline of the color portion of the desired design, and transparent or other coating material is preferably applied through one or more other stencils of the outline of remaining portions of the desired design.

I have found that my invention is of particular advantage for decorating ware of urea resin, in which the phenomenon of the non-absorptive outer surface and the more porous interior texture is very pronounced.

In the drawings:—

Figure 1 is a plan of a molded resin ware article, showing a mask applied thereto, and the surface of the article removed through the mask opening of the outline of the desired design;

Figure 2 is a vertical section taken along the line 2—2 of Figure 1, showing the preferred sand-blasting nozzle in operation for the removal of the outer surface;

Figure 3 is an enlarged section showing coloring material being applied under pressure sufficient to penetrate the sub-surface exposed by the removal of the outer surface;

Figure 4 is a similar view, showing other coating material being applied to penetrate the remainder of the exposed sub-surface.

Figure 5 is a similar enlarged section taken along the line 5—5 of Figure 6, showing the completed ornamentation; and Figure 6 is a plan of the decorated molded resin ware according to the preferred embodiment of the present invention.

As shown in Figure 1, a suitable mask 10 of a material which will resist sand-blasting and having an opening 12 of the outline of the desired design, is applied to the outer shell or surface 14 of the article of molded resin ware 15 to be decorated or ornamented. By using this mask, only that part of the outer surface is removed which falls within the limits of the design.

The outer surface within the outline 12 is then removed, preferably by an abrading operation such as sand-blasting 16 by means of a nozzle 17 as shown in Figure 2.

The removal of the outer surface exposes a sub-surface 18, best shown in Figure 3, which is enlarged to illustrate the porous texture thereof, the mask being removed as soon as the sand-blasting operation is completed. The sub-surface 18 is softer, and of a much more porous texture, than the hard outer surface or shell 14, and has a much greater absorption quality. Furthermore, the abrasion thereof by the sand-blast operation further roughens the surface and increases its adaptability for binding or adhesion of coating materials applied thereto.

A stencil 20 is now applied, which has one or more openings 22 of the outline of a color portion of the desired design, such as the portions 21 shown in black in Figure 6. Coloring material, such as a satisfactory ink, dye, or waterproof lacquer, is applied under pressure, for example by means of the gun or nozzle 23 shown in Figure 3. The pressure forces the coloring material into the sub-surface, and causes it to penetrate the pores 24. This is shown in exaggerated form in Figure 3, the pores 24 being shown as filled with the coloring material from the nozzle 23. The depth of coloring material applied is such that when the nozzle 23 and the stencil 20 are removed and the penetrated coating 29 has dried, and hardened, as shown in Figure 4, the coating 29 is of no greater depth than that of the material removed. The hardening of the coloring material while penetrating the pores of the sub-surface locks the coating thereto with a very strong bond.

It is obvious that if a design of more than one color is required, such as a two-color or three-color design, the color application step may be repeated with other colors and other stencils, to apply other color portions of the design, such for instance as the parts 25 shaded by vertical lines in Figure 6 to indicate a red color. Any number of applications of lacquers may be applied, giving any type of design which can be applied with a stencil.

After the color coatings have been applied, it is desirable to fill in or seal the remaining portions of the removed area with a transparent lacquer or other coating, to prevent cracking of the ware due to absorption of moisture by the porous sub-surface, and to protect it from accumulating extraneous material when the finished article is in use. For this purpose a stencil 26 (Fig. 4) having one or more openings 31 of the outline of the uncolored areas 27 shown in Fig. 6, within the larger outline of the whole design, is applied over the dried color coatings, and the transparent lacquer or other coating liquid is applied under pressure by a gun or nozzle 28, resulting in a penetrated transparent coating 30. The penetration of the coating liquid, and the bonding of coating applied thereby, are the same as described for the color coating applying steps.

When this final coating has dried, after the stencils and nozzles have been removed, the finished article has one or more color coatings 29, and a transparent or other coating 30, both penetrating the pores of the sub-surface and thereby bonded thereto, and together replacing the greater part if not the entire depth, and the entire area of the material removed.

The finished ware is thus protected from cracking due to absorption of moisture when in use, as the porous sub-surface is entirely covered. Peeling or stripping of the design is avoided by the firm bond due to the penetration of the coating material into the porous sub-surface. The design is also protected from being rubbed, scraped or chipped off, because the design is below the normal surface of the ware, and therefore has no projecting portion exposed to such action.

I claim:—

1. Process of decorating molded resin ware having a smooth non-absorptive outer surface formed by contact with a polished mold and a more porous texture underlying said outer surface and covered thereby both formed by heat and pressure treatment from the same resin molding compound, which comprises removing a predetermined portion of the area of said outer surface of the outline of the desired decoration to a depth sufficient to expose a sub-surface of said porous texture, covering a predetermined portion of said sub-surface of the outline of one color portion of the desired decoration with a coating of non-absorbent coloring material and simultaneously penetrating therewith a substantially uniform portion only of the depth of the porous texture below said sub-surface within said one color portion outline both without fusing said coloring material, and covering the exposed remainder of said sub-surface with non-absorbent coating material.

2. Process of decorating molded resin ware having a smooth non-absorptive outer surface formed by contact with a highly polished mold, and a more porous texture therewithin, both formed by a heat and pressure process from the same resin molding compound, which comprises removing an area of said outer surface to a depth sufficient to expose a sub-surface of said porous texture, and applying non-absorptive penetrating non-metallic coloring material in a cold but liquid state to said sub-surface in a predetermined pattern by pressure applied normal to said sub-surface whereby the coloring material penetrates said porous texture and covers said sub-surface both within said predetermined pattern, and similarly applying penetrating non-absorptive coating material to the exposed remainder of said sub-surface.

3. Process of decorating molded resin ware having a smooth non-absorptive outer surface formed by contact with a highly polished mold, and a more porous texture therewithin, both formed by a heat and pressure process from the same resin molding compound, which comprises sand blasting an area of said outer surface to a depth sufficient to expose a sub-surface of said porous texture which has a porosity in addition to the roughening incident to the sand blasting, and applying non-absorptive penetrating coloring material to said sub-surface in a predetermined pattern without fusing either said ware or said coloring material whereby the coloring material penetrates through said roughness into the pores therebelow, and colors said porosity below said roughness as well as covering said sub-surface both within said predetermined pattern, the depth of porosity thus colored being substantially equal to the depth of the outer surface removed and leaving an unaffected thickness of the ware many times said depths combined, and similarly applying penetrating coating material to the remainder of the exposed area of said sub-surface to seal the same against absorption of moisture or accumulation of extraneous material.

4. Decorated molded resin ware having a smooth non-absorptive outer surface and a more porous texture therewithin, said surface and said texture being of the same resin, said outer surface having an aperture of the outline of the desired decoration of a depth to expose a sub-surface of said porous texture, a coating of non-absorbent non-metallic coloring material covering a portion of said exposed sub-surface within said aperture and of the outline of one color portion of the desired decoration and penetrating the pores of said porous texture below said sub-surface within said one color portion outline the depth of the porosity thus colored being substantially equal to the depth of the aperture and leaving an unaffected thickness of the ware many times said depths combined, and a coating of non-absorbent surfacing material covering the exposed remainder of said sub-surface.

5. Decorated molded resin ware having a smooth non-absorptive outer surface formed by contact with its mold, and a more porous texture therewithin, both formed by a heat and pressure process from thermoplastic molding compound, an area of said outer surface being absent to a depth to expose a sub-surface of said porous texture, non-absorbent organic coloring material penetrating said porous texture to a depth substantially equal to the depth of said outer surface and covering said sub-surface both within a predetermined pattern, and non-absorbent coating material covering the exposed remainder of said sub-surface and penetrating the porous texture therebelow outside of said predetermined pattern.

6. Decorated molded resin ware having a hard dense smooth non-absorptive outer surface and a more porous texture therewithin, an area of said outer surface being absent to a depth sufficient to expose a sub-surface of said porous texture, non-absorbent coloring material covering a portion of said sub-surface within a predetermined pattern and penetrating the porous texture therebelow, non-absorbent coloring material of a different color covering another portion of said sub-surface within another predetermined pattern and penetrating the porous texture therebelow, and non-absorbent transparent coating material covering the exposed portion of said sub-surface remaining from said predetermined patterns and penetrating the porous texture therebelow.

7. Process of decorating molded resin ware having a smooth non-absorptive outer surface and a more porous texture underlying said outer surface which comprises removing a portion of said outer surface to a depth sufficient to expose a sub-surface of said porous texture, covering a portion of said sub-surface with a coating of non-absorbent non-metallic coloring material and simultaneously penetrating therewith under pressure the porous texture below said sub-surface, and covering the exposed remainder of said sub-surface with non-absorbent coating material.

8. Process of decorating molded resin ware having a smooth non-absorptive outer surface and a more porous texture therewithin, which comprises removing an area of said outer surface to a depth sufficient to expose a sub-surface of said porous texture, and applying non-absorptive penetrating coloring material in a cold but liquid state to said sub-surface under pressure, whereby the coloring material penetrates said porous texture, and similarly applying penetrating non-absorptive coating material to the exposed remainder of said sub-surface.

9. Process of decorating molded resin ware having a smooth non-absorptive outer surface and a more porous texture therewithin, which comprises sand blasting an area of said outer surface to a depth sufficient to expose a sub-surface of said porous texture which has a porosity in addition to the roughening incident to the sand-blasting, and applying non-absorptive penetrating coloring material to said sub-surface in a predetermined pattern without fusing either said ware or said coloring material under pressure sufficient to cause the coloring material to penetrate through said roughness into the pores therebelow, and color said porosity below said roughness as well as covering said sub-surface both within said predetermined pattern, and applying penetrating coating material to the remainder of the exposed area of said sub-surface to seal the same.

10. Decorated molded resin ware having a smooth non-absorptive outer surface and a more porous texture therebelow, said outer surface having an aperture therethrough of a depth only sufficient to expose a sub-surface of said porous texture, and non-absorptive unfused coloring material covering said sub-surface and penetrating the porous texture therebelow to a substantially uniform depth materially less than the thickness of said ware.

11. Process of decorating molded resin ware having a smooth non-absorptive outer surface and a more porous texture therewithin, which comprises removing a portion of said outer surface to a depth only sufficient to expose a sub-surface of said porous texture, penetrating said sub-surface with non-absorptive coloring material for a uniform portion only of the depth of said porous texture without fusing said coloring material, and simultaneously covering said sub-surface with said coloring material.

ROY H. CUNNINGHAM.